(12) United States Patent
Li et al.

(10) Patent No.: US 11,973,334 B2
(45) Date of Patent: Apr. 30, 2024

(54) POWER CORD WITH LEAKAGE CURRENT DETECTION AND INTERRUPTION FUNCTION

(71) Applicant: Chengli Li, Suzhou (CN)

(72) Inventors: Chengli Li, Suzhou (CN); Long Chen, Suzhou (CN)

(73) Assignee: Chengli Li, Suzhou (CN)

( * ) Notice: Subject to any disclaimer, the term of this patent is extended or adjusted under 35 U.S.C. 154(b) by 0 days.

(21) Appl. No.: 18/178,409

(22) Filed: Mar. 3, 2023

(65) Prior Publication Data

US 2023/0268729 A1    Aug. 24, 2023

Related U.S. Application Data

(63) Continuation of application No. 17/682,598, filed on Feb. 28, 2022, now Pat. No. 11,600,984.

(30) Foreign Application Priority Data

Feb. 23, 2022 (CN) .......................... 202210166502.6
Feb. 23, 2022 (CN) ......................... 202220368421.X

(51) Int. Cl.
| | |
|---|---|
| *H02H 3/16* | (2006.01) |
| *H01H 83/02* | (2006.01) |
| *H02H 1/00* | (2006.01) |
| *H02H 7/22* | (2006.01) |

(52) U.S. Cl.
CPC .......... *H02H 1/0038* (2013.01); *H01H 83/02* (2013.01); *H02H 3/16* (2013.01); *H02H 7/228* (2013.01)

(58) Field of Classification Search
CPC ......... H02H 1/0038; H02H 3/16; H01H 83/02
See application file for complete search history.

(56) References Cited

U.S. PATENT DOCUMENTS

| | | |
|---|---|---|
| 4,707,759 A | 11/1987 | Bodkin |
| 5,708,364 A | 1/1998 | Vokey et al. |
| 6,697,238 B2 | 2/2004 | Bonilla et al. |
| 8,605,402 B2 | 12/2013 | Ward et al. |
| 8,853,539 B2 * | 10/2014 | Ye .......................... H01B 7/328 174/106 R |
| 9,312,680 B2 | 4/2016 | Li et al. |
| 9,331,582 B2 | 5/2016 | Goerke |
| 9,356,402 B2 | 5/2016 | Sung et al. |

(Continued)

FOREIGN PATENT DOCUMENTS

WO    2010011321 A1    1/2010

*Primary Examiner* — Scott Bauer
(74) *Attorney, Agent, or Firm* — Chen Yoshimura LLP

(57) ABSTRACT

A power cord with leakage current detection and interruption (LCDI) function includes at least two power supply lines, at least two insulating layers respectively covering the at lease two power supply lines, at least two leakage current detection lines respectively disposed around the at least two insulating layers, including a first leakage current detection line and a second leakage current detection line, at least one connector line, electrically coupled to the first leakage current detection line and/or the second leakage current detection line, and at least one insulating structure, covering at least one of the at least two leakage current detection lines, to electrically insulate the first and second leakage current detection lines from each other.

10 Claims, 10 Drawing Sheets

(56) References Cited

U.S. PATENT DOCUMENTS

| | | |
|---|---|---|
| 9,535,106 B2 | 1/2017 | Li |
| 9,547,047 B2 | 1/2017 | Li et al. |
| 9,564,119 B2 | 2/2017 | Ryu et al. |
| 9,697,926 B2 | 7/2017 | Huang et al. |
| 10,840,698 B2 | 11/2020 | Li et al. |
| 10,886,724 B2 | 1/2021 | Li et al. |
| 11,281,070 B2 | 3/2022 | Sun et al. |
| 11,381,070 B1 | 7/2022 | Legatti |
| 11,600,984 B1 | 3/2023 | Li et al. |
| 2006/0119997 A1 | 6/2006 | Lee |
| 2006/0146456 A1 | 7/2006 | Williams |
| 2006/0198067 A1 | 9/2006 | Pearse |
| 2007/0159740 A1 | 7/2007 | Williams et al. |
| 2008/0007878 A1 | 1/2008 | Gandolfi et al. |
| 2008/0062593 A1 | 3/2008 | Li et al. |
| 2008/0099227 A1 | 5/2008 | Zhang et al. |
| 2010/0020452 A1 | 1/2010 | Gandolfi |
| 2010/0046128 A1 | 2/2010 | Wang et al. |
| 2011/0061892 A1 | 3/2011 | Ye et al. |
| 2011/0273813 A1 | 11/2011 | Huang |
| 2012/0119918 A1 | 5/2012 | Williams |
| 2012/0249151 A1 | 10/2012 | Dobusch et al. |
| 2014/0117995 A1 | 5/2014 | Topucharla |
| 2015/0009592 A1 | 1/2015 | Aromin et al. |
| 2015/0309105 A1 | 10/2015 | Ostrovsky et al. |
| 2015/0349517 A1 | 12/2015 | Li et al. |
| 2016/0111869 A1 | 4/2016 | Li et al. |
| 2017/0222425 A1 | 8/2017 | Li et al. |
| 2018/0292466 A1 | 10/2018 | Hackl et al. |
| 2019/0089074 A1 | 3/2019 | Oms |
| 2019/0097412 A1 | 3/2019 | Li et al. |
| 2019/0115748 A1 | 4/2019 | Li et al. |
| 2020/0091707 A1 | 3/2020 | Li et al. |
| 2020/0366083 A1 | 11/2020 | Li et al. |
| 2020/0393520 A1 | 12/2020 | Li et al. |
| 2021/0006060 A1 | 1/2021 | Li et al. |
| 2021/0027915 A1 | 1/2021 | Aromin et al. |
| 2021/0125746 A1 | 4/2021 | Aromin et al. |
| 2021/0125753 A1 | 4/2021 | Aromin et al. |
| 2021/0125754 A1 | 4/2021 | Aromin et al. |
| 2021/0239770 A1 | 8/2021 | Li et al. |
| 2022/0011378 A1 | 1/2022 | Li et al. |
| 2024/0063631 A1 | 2/2024 | Zou et al. |

* cited by examiner

POWER CORD WITH LEAKAGE CURRENT DETECTION AND INTERRUPTION FUNCTION

BACKGROUND OF THE INVENTION

Field of the Invention

This invention relates to electrical circuits, and in particular, it relates to a leakage current detection and interruption (LCDI) device for a power cord, and related electrical connectors and electrical appliances.

Description of Related Art

Leakage current detection and interruption (LCDI) device is a fire hazard prevention device for electrical appliances. Its is implemented in a power cord with a plug, and functions to detect any leakage current between the hot and neutral power supply lines and their shield layers along the power cord from the plug to the electrical load (e.g., air conditioner, dehumidifier, etc.). When a leakage current is detected, the LCDI device can disconnect the electrical power from the power source to the appliance, preventing fire hazard and ensuring safety. Thus, LCDI devices can prevent fire hazard caused by arc fault due to physical damage and lost of insulation in the power cord, which may be caused by aging of the hot, neutral and ground wires, wear, pinching, animal chewing, etc.

In some conventional LCDI devices, when the device has lost its protection function due to an open circuit condition in the leakage current detection line for the hot or neutral wire, the power cord can still output power. This is a hidden threat of fire hazard and other hazards.

SUMMARY

Therefore, there is a need for an LCDI device that can detect the proper function of the leakage current detection lines.

To achieve the above objects, the present invention provides a leakage current detection and interruption (LCDI) device for a power cord, which includes: a switch module, configured to control an electrical connection of a first power supply line and a second power supply line between an input end and an output end; a leakage current detection module, including a first leakage current detection line and a second leakage current detection line, wherein the first leakage current detection line covers the first power supply line, and is configured to detect a first leakage current signal on the first power supply line and to generate a first self-test fault signal in response to the first leakage current detection line having open circuit, wherein the second leakage current detection line covers the second power supply line of the power cord, and is configured to detect a second leakage current signal on the second power supply line and to generate a second self-test fault signal in response to the second leakage current detection line having an open circuit; a drive module, coupled to the switch module and the leakage current detection module, and configured to: receive the first leakage current signal and the first self-test fault signal, and drive the switch module to disconnect the electrical connection in response to the first leakage current signal or the first self-test fault signal; and/or receive the second leakage current signal and the second self-test fault signal, and drive the switch module to disconnect the electrical connection in response to the second leakage current signal or the second self-test fault signal.

In some embodiments, the LCDI device further includes: a self-test module, coupled to the leakage current detection module, the drive module, the first power supply line, and the second power supply line, and configured to detect whether an open circuit is present on at least one of the first and second leakage current detection lines, to cooperate with the first leakage current detection line to generate the first self-test fault signal when the first leakage current detection line has an open circuit, and to cooperate with the second leakage current detection line to generate a second self-test fault signal when the second leakage current detection line has an open circuit.

In some embodiments, the drive module includes: a coil configured to generate an electromagnetic force to drive the switch module; and at least one semiconductor device, coupled in series with the coil, and configured to generate a current in the coil to generate the electromagnetic force in response to one or more of the first leakage current signal, the second leakage current signal, the first self-test fault signal, and the second self-test fault signal.

In some embodiments, the semiconductor device is selected from a group consisting of: silicon controlled rectifiers (SCRs), bipolar junction transistors, field-effect transistors, and photoelectric coupling elements.

In some embodiments, the LCDI device further includes: at least one test module, including a test switch coupled to the leakage current detection module, wherein the drive module is further configured to drive the switch module to disconnect the electrical connection in response to the test switch being manually closed and the leakage current detection module having no open circuit.

In some embodiments, one end of the test switch is coupled to one end of the first leakage current detection line and one end of the second leakage current detection line, another end of the test switch is coupled to the first power supply line or the second power supply line, and wherein another end of the first leakage current detection line and another end of the second leakage current detection line are coupled to the drive module.

In some embodiments, the at least one test module includes a first test module having a first test switch and a second test module having a second test switch, wherein one end of the first test switch is coupled to one end of the first leakage current detection line, another end of the first test switch is couple to the first power supply line, and another end of the first leakage current detection line is coupled to the drive module, and wherein one end of the second test switch is coupled to one end of the second leakage current detection line, another end of the second test switch is couple to the second power supply line, and another end of the second leakage current detection line is coupled to the drive module.

In another aspect, the present invention provides an electrical power connection device, which includes: a body; and an LCDI device according to any of the above embodiments, disposed inside the body.

In another aspect, the present invention provides an electrical appliance, which includes: an electrical load; and an electrical power connection device coupled between a power supply and the electrical load, configured to supply power to the electrical load, wherein the electrical power connection device includes an LCDI device according to any of the above embodiments.

In the various embodiments, the two leakage current detection lines are respectively configured to cover one power supply line and to form a leakage current detection path with the drive module. Thus, the device can individually detect the leakage currents on the two leakage current detection lines and to individually detect open circuit fault in the two leakage current detection lines. The LCDI devices according to embodiments of the present invention have a simple structure, and are low cost and reliable.

BRIEF DESCRIPTION OF THE DRAWINGS

Preferred embodiments of the present invention are described with reference to the drawings. These drawings explain the embodiments and their operating principle, and only illustrate structures that are necessary to the understanding of the invention. These drawings are not to scale. In the drawings, like features are designated by like reference symbols. In the block diagrams, lines between blocks represent electrical or magnetic coupling of the blocks; the absence of lines between blocks does not mean the lack of coupling.

DETAILED DESCRIPTION OF PREFERRED EMBODIMENTS

Preferred embodiments of the present invention are described below with reference to the drawings. These drawings and descriptions explain embodiments of the invention but do not limit the invention. The described embodiments are not all possible embodiments of the present invention. Other embodiments are possible without departing from the spirit and scope of the invention, and the structure and/or logic of the illustrated embodiments may be modified. Thus, it is intended that the scope of the invention is defined by the appended claims.

Before describing the embodiments, some terms used in this disclosure are defined here to help the reader better understand this disclosure.

In this disclosure, terms such as "connect", "couple", "link" etc. should be understood broadly, without limitation to physical connection or mechanical connection, but can include electrical connection, and can include direct or indirection connections. Terms such as "a" and "one" do not limit the quantity, and refers to "at least one".

In the descriptions below, terms such as "including" are intended to be open-ended and mean "including without limitation", and can include other contents. "Based on" means "at least partly based on." "An embodiment" means "at least one embodiment." "Another embodiment" means "at least another embodiment," etc. In this disclosure, the above terms do not necessarily refer to the same embodiments. Further, the various features, structures, materials or characteristics may be suitably combined in any of the one or more embodiments. Those of ordinary skill in the art may combine the various embodiments and various characteristics of the embodiments described herein when they are not contrary to each other.

Embodiments of the present invention provide an LCDI device, where each of the two leakage current detection lines is configured to cover one of the two power supply lines and form a leakage current detection loop with the drive module. Thus, the LCDI device can individually detect the leakage current on the two power supply lines and individually detect the open circuit conditions of the two leakage current detection lines.

Figure 1:
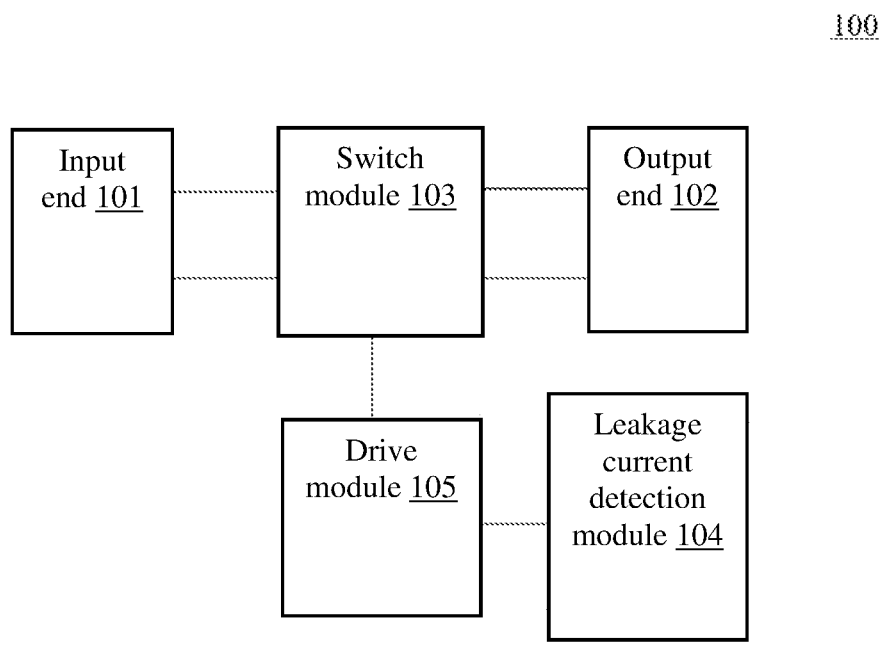
FIG. 1 is a block diagram of an LCDI device according to embodiments of the present invention.

FIG. 1 is a block diagram of an LCDI device according to embodiments of the present invention. As shown in FIG. 1, the LCDI device 100 for a power cord includes a switch module 103, a leakage current detection module 104, and a drive module 105. The switch module 103 controls the electrical connection between the input end 101 and output end 102 of the device. The leakage current detection module 104 includes a first leakage current detection line and a second leakage current detection line. The first leakage current detection line covers the first power supply line of the power cord, and functions to detect a first leakage current signal on the first power supply line or generate a first self-test fault signal when the first leakage current detection line has an open circuit condition. The second leakage current detection line covers the second power supply line of the power cord, and functions to detect a second leakage current signal on the second power supply line or generate a second self-test fault signal when the second leakage current detection line has an open circuit condition.

The drive module 105 is coupled to the switch module 103 and the leakage current detection module 104, configured to receive the first leakage current signal and the first self-test fault signal, and to drive the switch module 103 to disconnect the power connection in response to the first leakage current signal or the first self-test fault signal. The drive module 105 is further configured to receive the second leakage current signal and the second self-test fault signal, and to drive the switch module 103 to disconnect the power connection in response to the second leakage current signal or the second self-test fault signal. In other words, each of the first leakage current signal, the first self-test fault signal, the second leakage current signal, and the second self-test fault signal can trigger the drive module 105 to drive the switch module 103 to disconnect the power connection. When the first leakage current detection line detects a first leakage current signal or generates a first self-test fault signal, and/or when the second leakage current detection line detects a second leakage current signal or generates a second self-test fault signal, the detected or generated signal is provided to the drive module 105, and in response thereto, the drive module 105 drives the switch module 103 to disconnect the power connection. In the LCDI device 100, the two leakage current detection lines separately and respectively cover the two power supply lines, and each leakage current detection line forms a detection loop with the drive module. Therefore, the LCDI device 100 can individually detect the leakage currents on the two power supply lines and the open circuit conditions of the two leakage current detection lines.

In some embodiments, the LCDI device 100 further includes a self-test module (not shown in FIG. 1). The self-test module is coupled to the leakage current detection module 104, the drive module 105, the first power supply line, and the second power supply line, and functions to detect whether an open circuit condition is present on at least one of the first and second leakage current detection lines. When the first leakage current detection line has an open circuit condition, the self-test module cooperates with the first leakage current detection line to generate a first self-test fault signal. When the second leakage current detection line has an open circuit condition, the self-test module cooperates with the second leakage current detection line to generate a second self-test fault signal. Using the self-test module, the LCDI device can detect faults (e.g., open circuit) in the first and second leakage current detection lines, and can disconnect the power in response to such detected faults, thereby improving the reliability of the LCDI device 100.

In some embodiments, the drive module 105 includes a coil and at least one semiconductor device. The coil is configured to generate an electromagnetic force to drive the switch module 103. The semiconductor device is coupled in series with the coil, and configured to cause the coil to generate the electromagnetic force in response to one or more of the first leakage current signal, the second leakage current signal, the first self-test fault signal, and the second self-test fault signal. The semiconductor device may be a silicon controlled rectifier (SCR), bipolar junction transistor, field-effect transistor, photoelectric coupling element, etc.

In some embodiments, the LCDI device 100 further includes at least one test module (not shown in FIG. 1), which includes a test switch coupled to the leakage current detection module 104. When the test switch is manually closed and the leakage current detection module 104 functions normally, the drive module 105 drives the switch module 103 to disconnect the power. When the test switch is manually closed and the leakage current detection module 104 is faulty, the switch module 103 maintains the power connection. By using the test module, the user can manually test whether the leakage current detection module 104 (e.g. the first and second leakage current detection lines) is faulty (e.g., open circuit). When the leakage current detection module 104 is faulty, the continued electrical connection will warn the user of the fault, thereby improving the reliability of the LCDI device 100.

Figure 2:
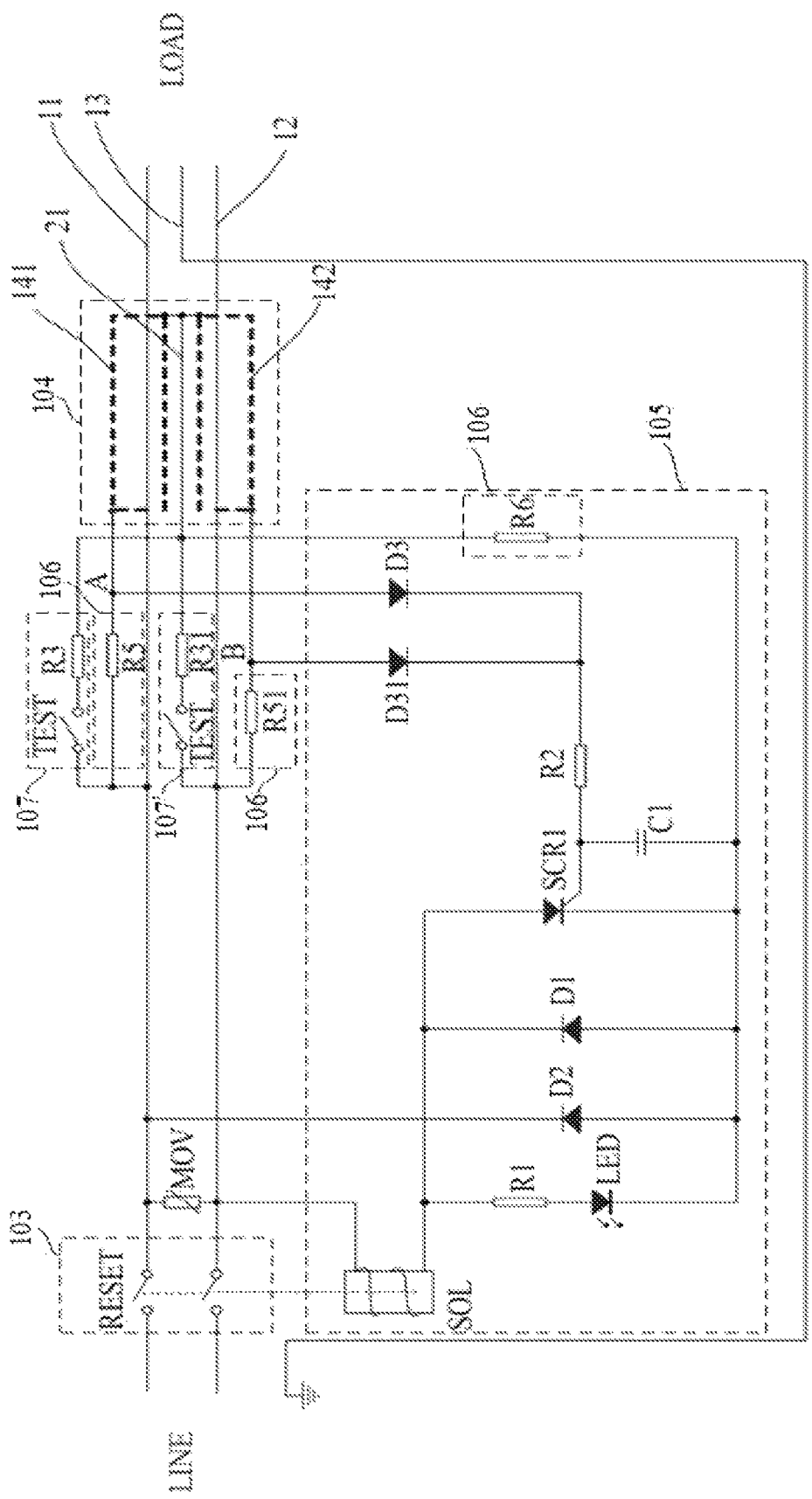
FIG. 2 is a circuit diagram of an LCDI device according to a first embodiment of the present invention.

FIG. 2 is a circuit diagram of an LCDI device according to a first embodiment of the present invention. As shown in FIG. 2, the LCDI device includes a switch module 103, a leakage current detection module 104, a drive module 105, a self-test module 106, and two test modules 107 and 107'. The switch module 103 includes a reset switch RESET, located on the power supply lines to control the electrical connection between the input end LINE and output end LOAD. The power supply lines include a first power supply line 11 (hot line), a second power supply line 12 (neutral line), and a third power supply line 13 (ground line). The leakage current detection module 104 includes a first leakage current detection line 141, a second leakage current detection line 142, and a connector line 21. The first leakage current detection line 141 covers the first power supply line 11, and the second leakage current detection line 142 covers the second power supply line 12. In this embodiment, the first end of each of the first leakage current detection line 141, second leakage current detection line 142 and connector line 21 is the end farther away from the load LOAD, i.e. on the left-hand side of FIG. 2, while the second end of each of these lines is the end closer to the load LOAD, i.e. on the right-hand side of FIG. 2.

As shown in FIG. 2, the second end of the first leakage current detection line 141 and the second end of the second leakage current detection line 142 are both coupled to the second end of the connector line 21. The first end of the first leakage current detection line 141 is coupled to one end of resistor R5 of the self-test module 106 at point A, and the other end of resistor R5 is coupled to the first power supply line 11, the reset switch RESET, and one end of the test switch TEST of the first test module 107. The first end of the second leakage current detection line 142 is coupled to one end of resistor R51 of the self-test module 106 at point B, and the other end of resistor R51 is coupled to the second power supply line 12, the reset switch RESET, and one end of the test switch TEST of the second test module 107'. The first end of the connector line 21 is coupled to one end of resistor R3 of the first test module 107, one end of resistor R31 of the second test module 107', and one end of resistor R6. The other ends of resistors R3 and R31 are respectively coupled to the other end of the respective test switches TEST of the two test modules.

In the drive module 105, diode D3 is coupled at its anode to point A, and at its cathode to one end of resistor R2. The diode D31 is coupled at its anode to point B, and at its cathode to the same end of resistor R2. The other end of resistor R2 is coupled to the control electrode of the silicon controlled rectifier SCR1. The capacitor C1 is coupled between the control electrode and cathode of the silicon controlled rectifier SCR1. The silicon controlled rectifier SCR1 is also coupled at its cathode to the anodes of diodes D1 and D2, and at its anode to the cathode of diode D1 and one end of solenoid SOL. The other end of the solenoid SOL is coupled to the second power supply line 12 and reset switch RESET. The cathode of diode D2 is coupled to the first power supply line 11 and reset switch RESET.

When the first leakage current detection line 141, second leakage current detection line 142 and connector line 21 all function normally (i.e., no open circuit conditions), a current flows from the first power supply line 11 through a first current path formed by R5-141-21-R6-D1-SOL to the second power supply line 12, and through a second current path formed by R5-141-142-R51 to the second power supply line 12. The resistance of resistor R51 is set to be much higher than that of resistor R6, so that the current primarily flows through the first current path. By setting the resistance values of resistors R5 and R6, the voltage at point A is limited to a relatively low level, insufficient to trigger the silicon controlled rectifier SCR1 via resistor R2. Similarly, a current flows from the second power supply line 12 through a first current path formed by R51-142-21-R6-D2 to the first power supply line 11, and through a second current path formed by R51-142-141-R5 to the first power supply line 11. The resistance of resistor R5 is set to be much higher than that of resistor R6, so that the current primarily flows through the first current path. By setting the resistance values of resistors R51 and R6, the voltage at point B is limited to a relatively low level, insufficient to trigger the silicon controlled rectifier SCR1 via resistor R2. In this condition, the switch module 103 is closed, and the power cord conducts power normally.

When the first power supply line 11 has a leak to the first leakage current detection line 141, a leakage current (first leakage current signal) flows from the first power supply line 11 through 141-D3-R2, the voltage at point A rises, which triggers the silicon controlled rectifier SCR1 to conduct. As a result, a sufficiently large current flows through the solenoid SOL, which generates a sufficiently large magnetic field to trip (open) the reset switch RESET of the switch module 103, thereby cutting off the electrical connection from the input end LINE to output end LOAD. Similarly, when the second power supply line 12 has a leak to the second leakage current detection line 142, a leakage current (second leakage current signal) flows from the second power supply line 12 through 142-D31-R2, the voltage at point B rises, which triggers the silicon controlled rectifier SCR1 to conduct. As a result, the solenoid SOL trips the reset switch RESET, thereby cutting off electrical connection to output end LOAD. Therefore, the LCDI device can independently detect the first and second leakage current signals caused by leaks on the first and second power supply lines 11 and 12.

When the first leakage current detection line 141 has an open circuit condition, resistor R6 loses its voltage regulation function for point A, the voltage at point A rises due to a current flow (first self-test fault signal) from the first power supply line 11 through R5-D3-R2, which triggers the silicon controlled rectifier SCR1 to conduct. As a result, the solenoid SOL trips the reset switch RESET of the switch module 103, thereby cutting off electrical connection to the output end LOAD. Similarly, when the second leakage current detection line 142 has an open circuit condition, resistor R6 loses its voltage regulation function for point B, the voltage at point B rises due to a current flow (second self-test fault signal) from the second power supply line 12 through R51-D31-R2, which triggers the silicon controlled rectifier SCR1 to conduct. As a result, the solenoid SOL trips the reset switch RESET, thereby cutting off electrical connection to the output end LOAD. Therefore, the LCDI device can independently detect fault conditions of the first and second leakage current detection lines 141 and 142.

In addition to the self-test module 106, the test modules 107 and 107' can also test faults in the leakage current detection module 104. In this embodiment, for the first test module 107, two test current paths are formed: path 11-TEST-R3-21-141-A-D3-R2-SCR1-D1-SOL-12, and path 11-TEST-R3-21-142-B-D31-R2-SCR1-D1-SOL-12. For the second test module 107', two test current paths are formed: path 12-TEST-R31-21-141-A-D3-R2-SCR1-D2-11, and path 12-TEST-R31-21-142-B-D31-R2-SCR1-D2-11.

When the first leakage current detection line 141, the second leakage current detection line 142 and the connector line 21 all function normally and there is no leakage current either between the first power supply line 11 and the first leakage current detection line 141 or between the second power supply line 12 and the second leakage current detection line 142, the silicon controlled rectifier SCR1 is not triggered, and the power cord conducts power normally.

In this normal condition, when the user depresses either or both of the two test switches TEST, current(s) flow through the relevant test current path(s), triggering the silicon controlled rectifier SCR1 to conduct, so that the solenoid SOL trips the reset switch RESET, cutting off power to the output end LOAD. If any one of the first leakage current detection line 141, the second leakage current detection line 142 and the connector line 21 has an open circuit condition, then when the user depresses either or both of the two test switches TEST, at least one of the test current paths cannot form a closed loop. As a result, the silicon controlled rectifier SCR1 cannot be triggered to cause the solenoid SOL to trip the reset switch RESET. More specifically, for example, when the test switch TEST in the first test module 107 is depressed, and the first leakage current detection line 141 is open but the second leakage current detection line 142 is not, due to the setting of the resistors R3 and R51, the voltage at point B will be insufficient to trigger the silicon controlled rectifier SCR1. Similarly, when the test switch TEST in the second test module 107' is depressed, and the second leakage current detection line 142 is open but the first leakage current detection line 141 is not, due to the setting of the resistors R31 and R5, the voltage at point A will be insufficient to trigger the silicon controlled rectifier SCR1. Therefore, power continues to be conducted to the output end LOAD. This indicates to the user that at least one of the first leakage current detection line 141, the second leakage current detection line 142 and the connector line 21 may have an open circuit condition. This way, the user may operate either or both of the two test switches TEST to test whether the first leakage current detection line 141, the second leakage current detection line 142 and the connector line 21 are normal.

It should be understood that either one of the two test modules 107 and 107' can detect the fault conditions of the first leakage current detection line 141, the second leakage current detection line 142 and the connector line 21. Therefore, the LCDI device may include only test module 107 or only test module 107'. Further, in addition to detecting fault conditions in the leakage current detection module 104, the test modules 107 and 107' may be used to detect whether other components of the test current paths are functioning normally.

Figure 3:
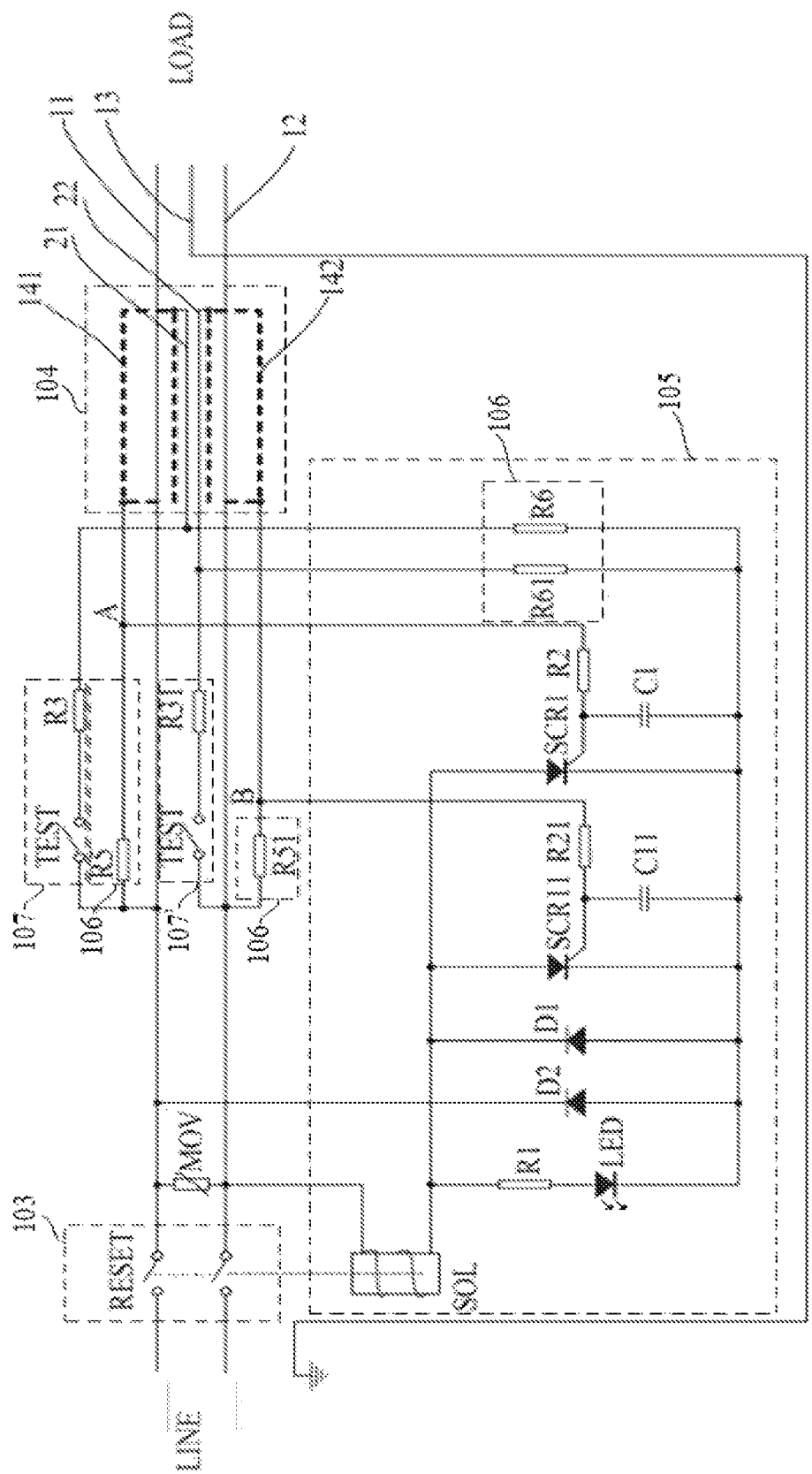
FIG. 3 is a circuit diagram of an LCDI device according to a second embodiment of the present invention.

FIG. 3 is a circuit diagram of an LCDI device according to a second embodiment of the present invention. Compared to the first embodiment of FIG. 2, the main differences are in the leakage current detection module 104 and the drive module 105. In the embodiment of FIG. 3, the leakage current detection module 104 includes a first leakage current detection line 141, a second leakage current detection line 142, and first and second connector lines 21 and 22. The first leakage current detection line 141 covers the first power supply line 11, and the second leakage current detection line 142 covers the second power supply line 12. Similar to the embodiment of FIG. 2, in the embodiment of FIG. 3, the first end of each of the first leakage current detection line 141, second leakage current detection line 142 and connector lines 21 and 22 is the end farther away from the load LOAD, i.e. on the left-hand side of FIG. 3, while the second end of each of these lines is the end closer to the load LOAD, i.e. on the right-hand side of FIG. 3.

The second end of the first leakage current detection line 141 is coupled to the second end of the first connector line 21, and the second end of the second leakage current detection line 142 is coupled to the second end of the second connector line 22. The first end of the first leakage current detection line 141 is coupled to one end of resistor R5 of the self-test module 106 at point A. The first end of the second leakage current detection line 142 is coupled to one end of resistor R51 of the self-test module 106 at point B. The first end of the first connector line 21 is coupled between resistors R3 and R6, and the first end of the second connector line 22 is coupled between resistors R31 and R61. In the drive module 105, a resistor R2 is coupled between point A and the control electrode of a first silicon controlled rectifier SCR1, and a resistor R21 is coupled between point B and the control electrode of a second silicon controlled rectifier SCR11. A capacitor C1 is coupled between the control electrode and cathode of the first silicon controlled rectifier SCR1, and a capacitor C11 is coupled between the control electrode and cathode of the second silicon controlled rectifier SCR11.

When the first leakage current detection line 141, second leakage current detection line 142 and the two connector lines 21 and 22 all function normally (i.e., no open circuit conditions), a current flows from the first power supply line 11 through a current path formed by R5-141-21-R6-D1-SOL to the second power supply line 12. By setting the resistance values of resistors R5 and R6, the voltage at point A is limited to a relatively low level, insufficient to trigger the first silicon controlled rectifier SCR1 via resistor R2. Similarly, a current flows from the second power supply line 12 through a current path formed by R51-142-22-R61-D2 to the first power supply line 11. By setting the resistance values of resistors R51 and R61, the voltage at point B is limited to a relatively low level, insufficient to trigger the second silicon controlled rectifier SCR11 via resistor R21. In this condition, the switch module 103 is closed, and the power cord conducts power normally.

When the first power supply line 11 has a leak to the first leakage current detection line 141, a leakage current (first leakage current signal) flows from the first power supply line 11 through 141-R2, the voltage at point A rises, which triggers the silicon controlled rectifier SCR1 to conduct. As a result, a sufficiently large current flows through the solenoid SOL, which generates a sufficiently large magnetic field to trip the reset switch RESET of the switch module 103, thereby cutting off the electrical connection from the input end LINE to output end LOAD. Similarly, when the second power supply line 12 has a leak to second leakage current detection line 142, a leakage current (second leakage current signal) flows from the second power supply line 12 through 142-R21, the voltage at point B rises, which triggers the second silicon controlled rectifier SCR11 to conduct. As a result, the solenoid SOL trips the reset switch RESET, thereby cutting off electrical connection to output end LOAD. Therefore, the LCDI device can independently detect the first and second leakage current signals caused by leaks on the first and second power supply lines 11 and 12.

When the first leakage current detection line 141 has an open circuit condition, resistor R6 loses its voltage regulation function for point A, the voltage at point A rises due to a current flow (first self-test fault signal) from the first power supply line 11 through R5-R2, which triggers the first silicon controlled rectifier SCR1 to conduct. As a result, the solenoid SOL trips the reset switch RESET of the switch module 103, thereby cutting off electrical connection to the output end LOAD. Similarly, when the second leakage current detection line 142 has an open circuit condition, resistor R61 loses its voltage regulation function for point B, the voltage at point B rises due to a current flow (second self-test fault signal) from the second power supply line 12 through R51-R21, which triggers the second silicon controlled rectifier SCR11 to conduct. As a result, the solenoid SOL trips the reset switch RESET, thereby cutting off electrical connection to the output end LOAD. Therefore, the LCDI device can independently detect fault conditions of the first and second leakage current detection lines 141 and 142.

In addition to the self-test module 106, the test modules 107 and 107' can also test faults in the leakage current detection module 104. In this embodiment, for the first test module 107, a test current path is formed from 11-TEST-R3-21-141-R2-SCR1-D1-SOL-12. For the second test module 107', a test current path is formed from 12-TEST-R31-22-142-R21-SCR11-D2-11.

When the first leakage current detection line 141, the second leakage current detection line 142 and the two connector lines 21 and 22 all function normally and there is no leakage current either between the first power supply line 11 and the first leakage current detection line 141 or between the second power supply line 12 and the second leakage current detection line 142, the silicon controlled rectifiers SCR1 and SCR11 are not triggered, and the power cord conducts power normally.

In this normal condition, when the user depresses the test switch TEST of the first test module 107, a current flows through the test current path 11-TEST-R3-21-141-R2-SCR1-D1-SOL-12, triggering the first silicon controlled rectifier SCR1 to conduct, so that the solenoid SOL trips the reset switch RESET, cutting off power to the output end LOAD. If either the first leakage current detection line 141 or the first connector line 21 has an open circuit condition, then when the user depresses the test switches TEST of the first test module 107, current cannot flow through above test current path; as a result, the first silicon controlled rectifier SCR1 cannot be triggered to trip the reset switch RESET. This indicates to the user that the first leakage current detection line 141 and/or the first connector line 21 has an open circuit condition. This way, the user may operate the test switch TEST of the first test module 107 to test whether the first leakage current detection line 141 and the first connector line 21 are normal.

Similarly, in the normal condition, when the user depresses the test switch TEST of the second test module 107', a current flows through the test current path 12-TEST-R31-22-142-R21-SCR11-D2-11, triggering the second silicon controlled rectifier SCR11 to conduct, so that the solenoid SOL trips the reset switch RESET, cutting off power to the output end LOAD. If either the second leakage current detection line 142 or the second connector line 22 has an open circuit condition, then when the user depresses the test switches TEST of the second test module 107', current cannot flow through above test current path; as a result, the second silicon controlled rectifier SCR11 cannot be triggered to trip the reset switch RESET. This indicates to the user that the second leakage current detection line 142 and/or the second connector line 22 has an open circuit condition. This way, the user may operate the test switch TEST of the second test module 107' to test whether the second leakage current detection line 142 and the second connector line 22 are normal.

Further, in addition to detecting faults in the leakage current detection module 104, the test modules 107 and 107' may be used to detect whether other components of the test current paths are functioning normally.

Figure 4:
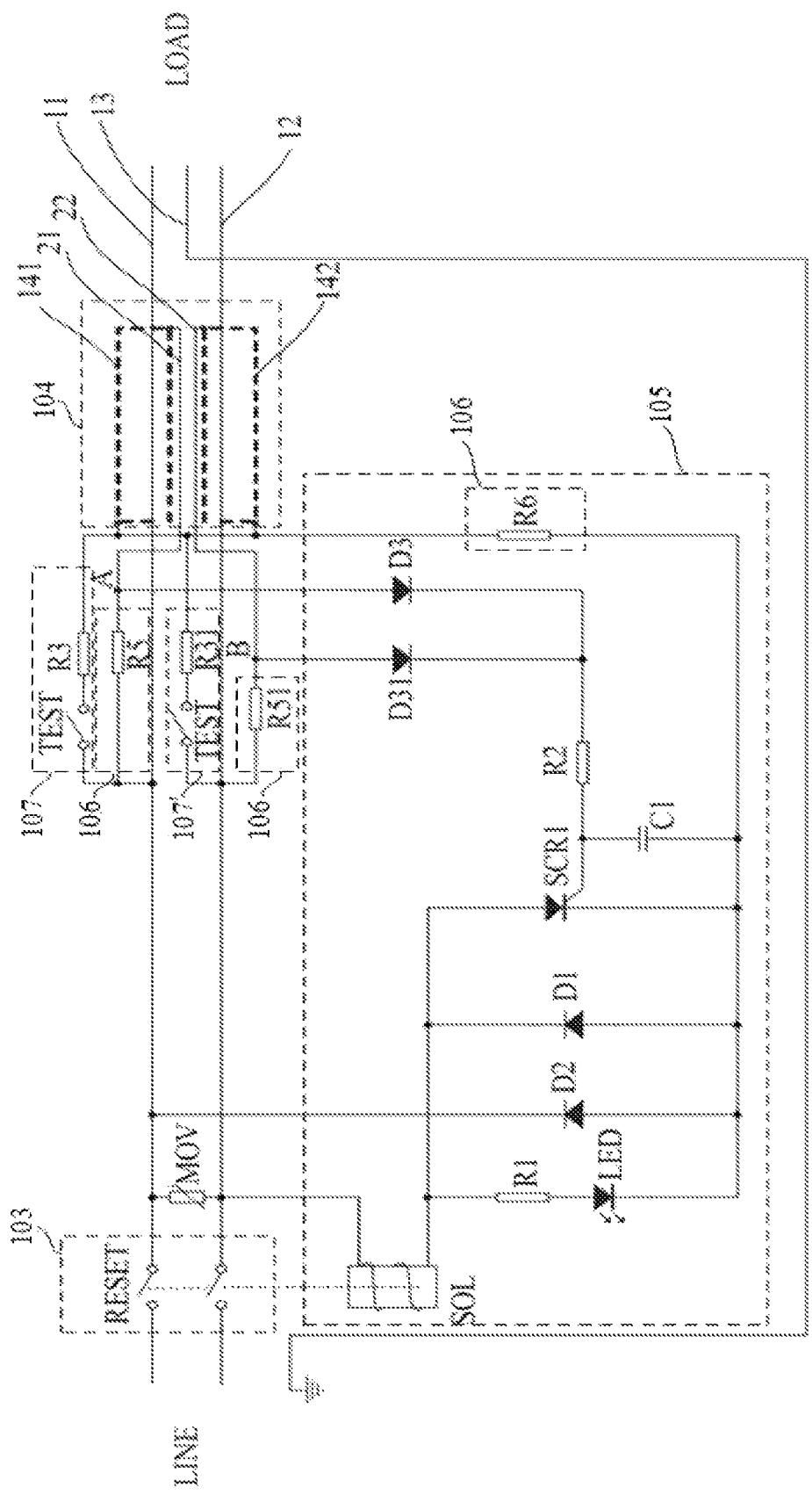
FIG. 4 is a circuit diagram of an LCDI device according to a third embodiment of the present invention.

FIG. 4 is a circuit diagram of an LCDI device according to a third embodiment of the present invention. Compared to the embodiment of FIG. 2, the main differences are in the connections in the leakage current detection module 104. More specifically, in the embodiment of FIG. 4, the leakage current detection module 104 includes a first leakage current detection line 141, a second leakage current detection line 142, and first and second connector lines 21 and 22. The first ends of the first and second leakage current detection lines 141 and 142 are both coupled resistors R3, R31, R6. The second end of the first leakage current detection line 141 is coupled to resistor R5 via the first connector line 21, and the second end of the second leakage current detection line 142 is coupled to resistor R51 via the second connector line 22. The operation of the leakage current detection module 104 for detecting leakage current on the first and second power supply lines 11 and 12, and the operation of the self-test module 106 and the test modules 107 and 107' for detecting fault in the leakage current detection module 104, are similar to those of the embodiment of FIG. 2 and further descriptions are omitted here.

Figure 5:
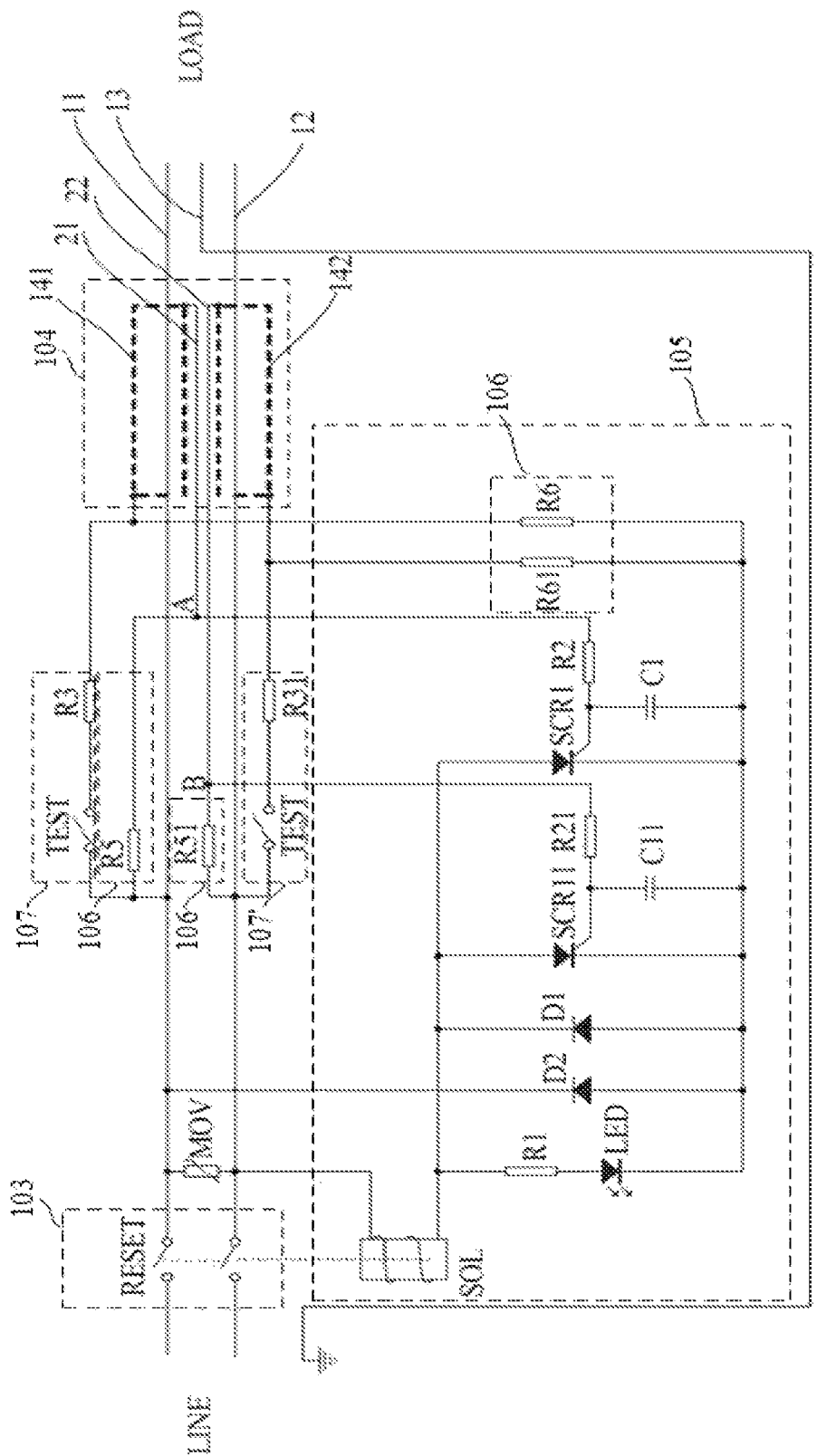
FIG. 5 is a circuit diagram of an LCDI device according to a fourth embodiment of the present invention.

FIG. 5 is a circuit diagram of an LCDI device according to a fourth embodiment of the present invention. Compared to the embodiment of FIG. 3, the main differences are in the connections in the leakage current detection module 104. More specifically, in the embodiment of FIG. 5, the first end of the first leakage current detection line 141 is coupled between resistors R3 and R6, and its second end is coupled between resistors R5 and R2 via the first connector line 21. The first end of the second leakage current detection line 142 is coupled between resistors R31 and R61, and its second end is coupled between resistors R51 and R21 via the second connector line 22. The operation of the leakage current detection module 104 for detecting leakage current on the first and second power supply lines 11 and 12, and the operation of the self-test module 106 and the test modules 107 and 107' for detecting fault in the leakage current detection module 104, are similar to those of the embodiment of FIG. 3 and further descriptions are omitted here.

Figure 6:
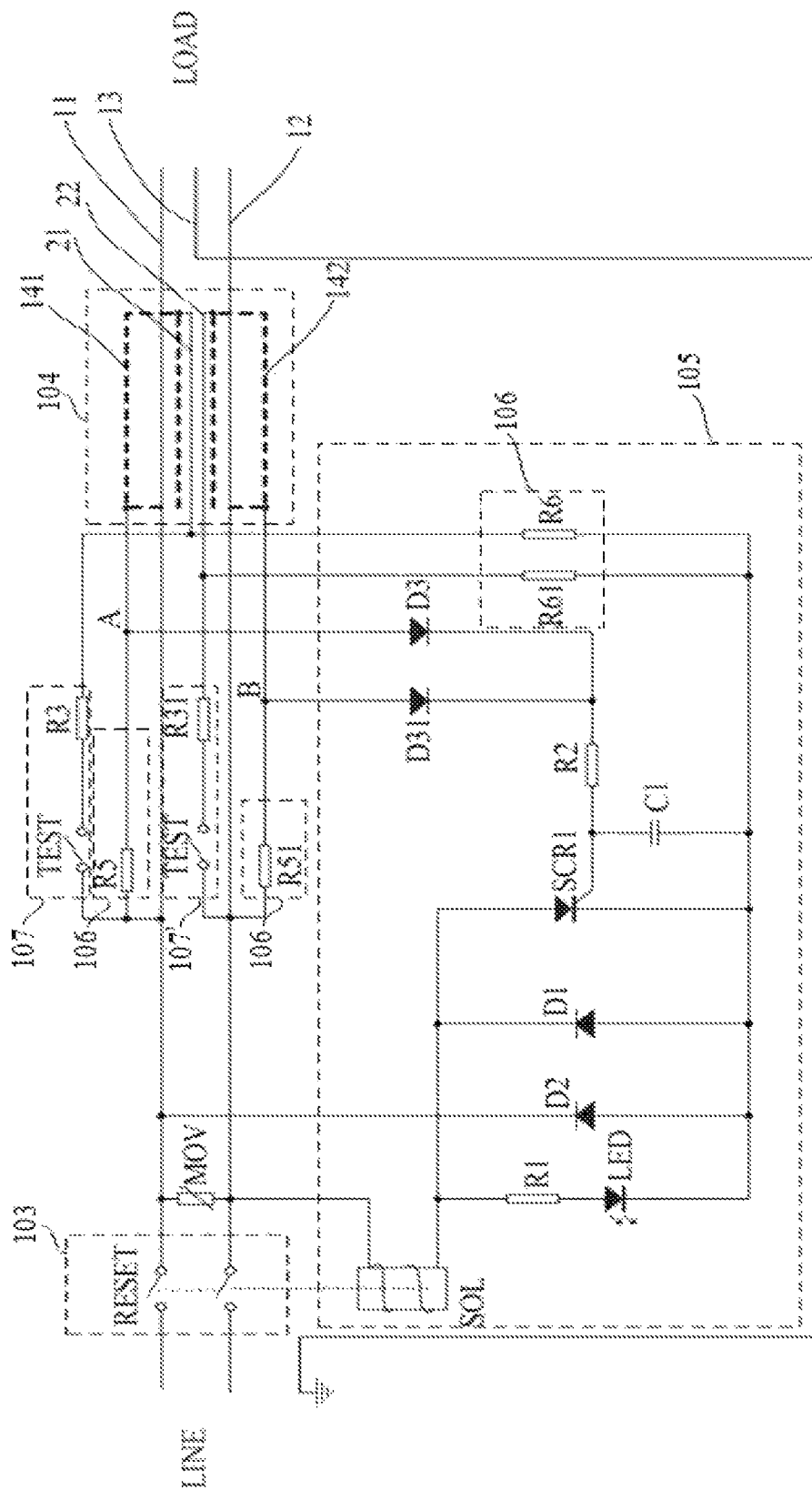
FIG. 6 is a circuit diagram of an LCDI device according to a fifth embodiment of the present invention.

FIG. 6 is a circuit diagram of an LCDI device according to a fifth embodiment of the present invention. Compared to the embodiment of FIG. 3, the main differences are in the drive module 105. In the embodiment of FIG. 6, the drive module 105 has a structure similar to that in the embodiment of FIG. 2, i.e., it uses only one silicon controlled rectifier SCR1 to drive the solenoid SOL. More specifically, the anode of diode D3 is coupled to the point A between resistor R5 and the first end of the first leakage current detection line 141; the anode of diode D31 is coupled to the point B between resistor R51 and the first end of the second leakage current detection line 142. The cathodes of both diodes D3 and D31 are couple to one end of resistor R2; the other end of resistor R2 is coupled to the control electrode of the silicon controlled rectifier SCR1. The operation of the leakage current detection module 104 for detecting leakage current on the first and second power supply lines 11 and 12, and the operation of the self-test module 106 and the test modules 107 and 107' for detecting fault in the leakage current detection module 104, are similar to those of the embodiments of FIG. 2 and FIG. 3, and further descriptions are omitted here.

Figure 7:
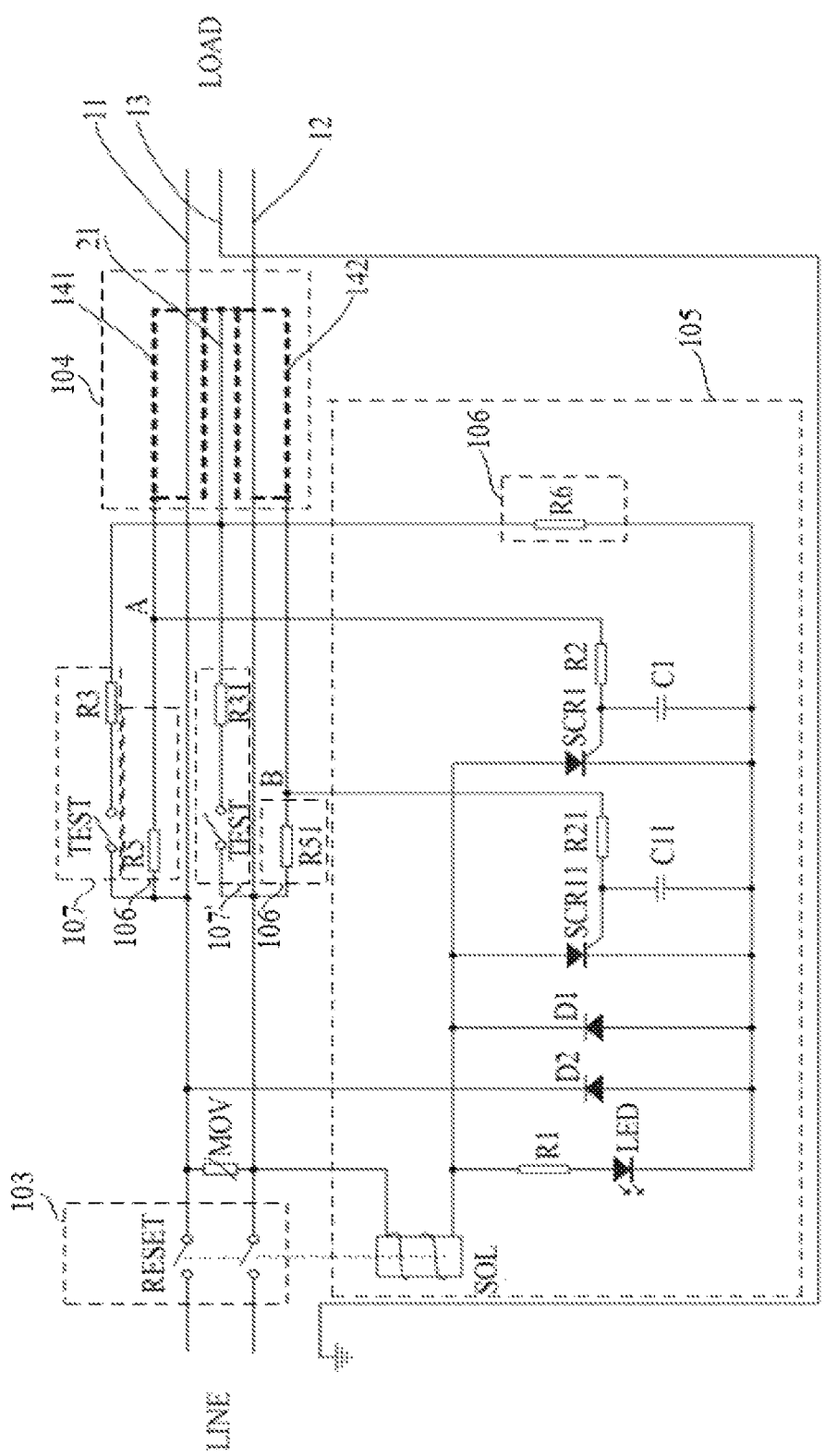
FIG. 7 is a circuit diagram of an LCDI device according to a sixth embodiment of the present invention.

FIG. 7 is a circuit diagram of an LCDI device according to a sixth embodiment of the present invention. Compared to the embodiment of FIG. 2, the main differences are in the drive module 105. In the embodiment of FIG. 7, the drive module 105 has a structure similar to that in the embodiment of FIG. 3, i.e., it uses two silicon controlled rectifiers SCR1 and SCR11 to drive the solenoid SOL. More specifically, resistor R2 is coupled at one end to the point A between resistor R5 and the first end of the first leakage current detection line 141, and at the other end to the control electrode of the first silicon controlled rectifier SCR1. The resistor R21 is coupled at one end to the point B between resistor R51 and the first end of the second leakage current detection line 142, and at the other end to the control electrode of the second silicon controlled rectifier SCR11. The operation of the leakage current detection module 104 for detecting leakage current on the first and second power supply lines 11 and 12, and the operation of the self-test module 106 and the test modules 107 and 107' for detecting fault in the leakage current detection module 104, are similar to those of the embodiments of FIG. 2 and FIG. 3, and further descriptions are omitted here.

Figure 8:
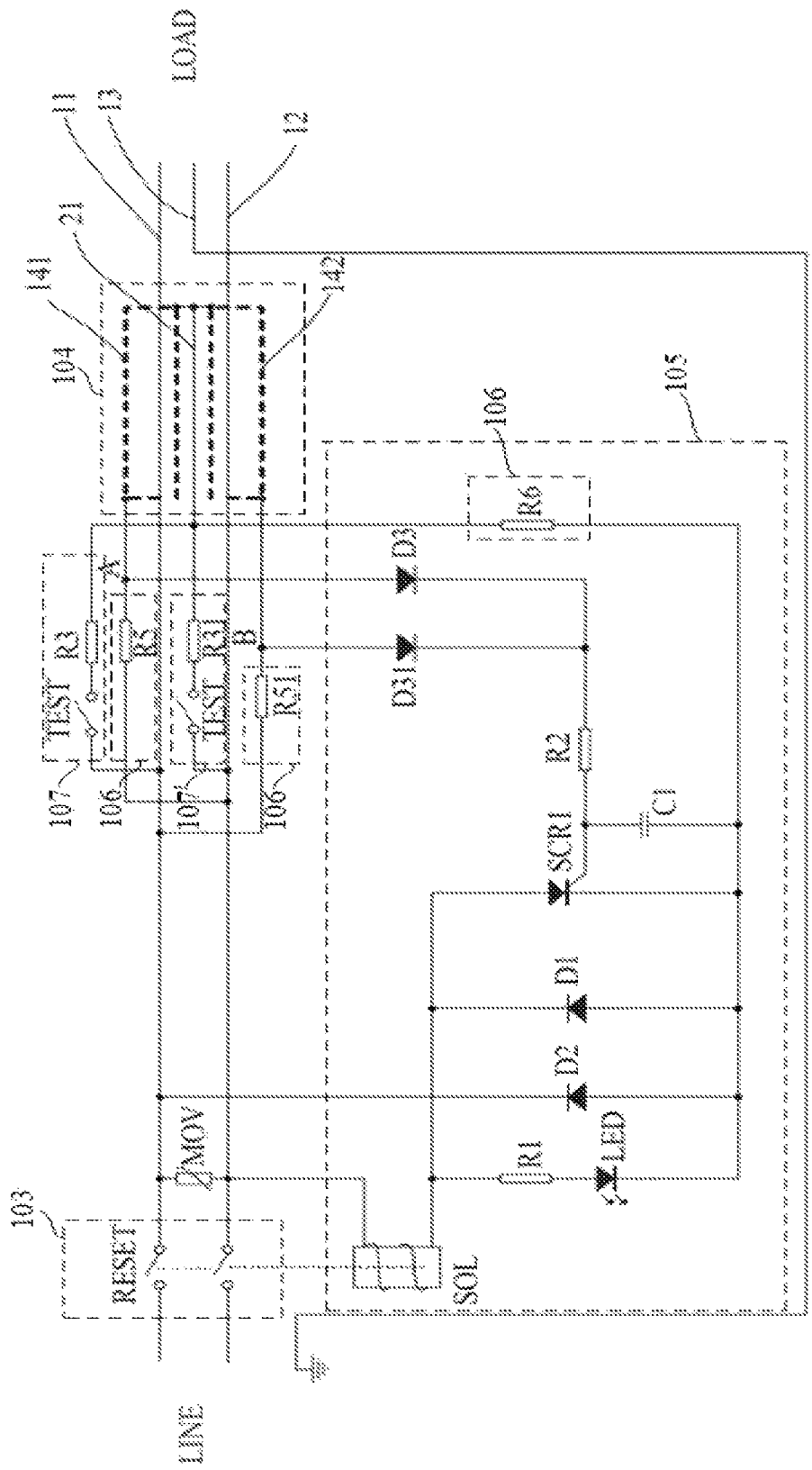
FIG. 8 is a circuit diagram of an LCDI device according to a seventh embodiment of the present invention.

FIG. 8 is a circuit diagram of an LCDI device according to a seventh embodiment of the present invention. Compared to the embodiment of FIG. 2, the main differences are in the connections in the self-test module 106. In the embodiment of FIG. 8, resistor R5 is coupled at one end to the anode of diode D3 and the first end of the first leakage current detection line 141, i.e., point A, and at the other end to the second power supply line 12. Resistor R51 is coupled at one end to the anode of diode D31 and the first end of the second leakage current detection line 142, i.e., point B, and at the other end to the first power supply line 11.

When the first leakage current detection line 141, second leakage current detection line 142 and connector line 21 all function normally (i.e., no open circuit conditions), a current flows from the second power supply line 12 through a first current path formed by R5-141-21-R6-D1 to the first power supply line 11, and through a second current path formed by R5-141-142-R51 to the first power supply line 11. The resistance of resistor R51 is set to be much higher than that of resistor R6, so that the current primarily flows through the first current path. By setting the resistance values of resistors R5 and R6, the voltage at point A is limited to a relatively low level, insufficient to trigger the silicon controlled rectifier SCR1 via resistor R2. Similarly, a current flows from the first power supply line 11 through a first current path formed by R51-142-21-R6-D1-SOL to the second power supply line 12, and through a second current path formed by R51-142-141-R5 to the second power supply line 12. The resistance of resistor R5 is set to be much higher than that of resistor R6, so that the current primarily flows through the first current path. By setting the resistance values of resistors R51 and R6, the voltage at point B is limited to a relatively low level, insufficient to trigger the silicon controlled rectifier SCR1 via resistor R2. In this condition, the switch module 103 is closed, and the power cord conducts power normally.

When the first power supply line 11 has a leak to the first leakage current detection line 141, a leakage current (first leakage current signal) flows from the first power supply line 11 through 141-D3-R2, the voltage at point A rises, which triggers the silicon controlled rectifier SCR1 to conduct. As a result, a sufficiently large current flows through the solenoid SOL, which generates a sufficiently large magnetic field to trip the reset switch RESET of the switch module 103, thereby cutting off the electrical connection from the input end LINE to output end LOAD. Similarly, when the second power supply line 12 has a leak to the second leakage current detection line 142, a leakage current (second leakage current signal) flows from the second power supply line 12 through 142-D31-R2, the voltage at point B rises, which triggers the silicon controlled rectifier SCR1 to conduct. As a result, the solenoid SOL trips the reset switch RESET, thereby cutting off electrical connection to output end LOAD. Therefore, the LCDI device can independently detect the first and second leakage current signals caused by leaks on the first and second power supply lines 11 and 12.

When the first leakage current detection line 141 has an open circuit condition, resistor R6 loses its voltage regulation function for point A, the voltage at point A rises due to a current flow (first self-test fault signal) from the second power supply line 12 through R5-D3-R2, which triggers the silicon controlled rectifier SCR1 to conduct. As a result, the solenoid SOL trips the reset switch RESET of the switch module 103, thereby cutting off electrical connection to the output end LOAD. Similarly, when the second leakage current detection line 142 has an open circuit condition, resistor R6 loses its voltage regulation function for point B, the voltage at point B rises due to a current flow (second self-test fault signal) from the first power supply line 11 through R51-D31-R2, which triggers the silicon controlled rectifier SCR1 to conduct. As a result, the solenoid SOL trips the reset switch RESET, thereby cutting off electrical connection to the output end LOAD. Therefore, the LCDI device can independently detect fault conditions of the first and second leakage current detection lines 141 and 142.

To summarize, in each of the embodiments shown in FIGS. 2-8, the self-test module 106 includes a first resistor (R5) coupled between one of the two power supply lines (11 in FIGS. 2-7 and 12 in FIG. 8) and one end (the line end in FIGS. 2, 3, 6, 7, 8 and the load end in FIGS. 4, 5) of the first leakage current detection line (141), a second resistor (R51) coupled between the other of the two power supply lines (12 in FIGS. 2-7 and 11 in FIG. 8) and one end (the line end in FIGS. 2, 3, 6, 7, 8 and the load end in FIGS. 4, 5) of the second leakage current detection line (142), and either: a third resistor (R6) coupled to the other ends of both the first and second leakage current detection lines (FIGS. 2, 4, 7, 8), or: a third resistor (R6) coupled to the other end of the first leakage current detection line (141) and a fourth resistor (R61) coupled to the other end of the second leakage current detection line (142) (FIGS. 3, 5, 6). The first and third resistors form a voltage divider when the first leakage current detection line 141 has no open circuit; the second and third resistors or the second and fourth resistors form a voltage divider when the second leakage current detection line 141 has no open circuit. The node (point A and B) between the two resistors in each voltage divider is coupled to the drive module 105 (the one or two silicon controlled rectifiers).

In FIGS. 2-8, each resistor is coupled to the relevant end of the relevant leakage current detection line either directly (e.g., in FIG. 2, R5 is coupled to the first leakage current detection line 141 directly) or via a connector line (e.g., in FIG. 2, R6 is coupled to the first leakage current detection line 141 via connector line 21). Note that in FIGS. 2-8, the first and second resistors (R5 and R51) are coupled to the same end (both the line end, or both the load end) of the respective first leakage current detection lines; alternatively, the first and second resistors may be coupled to different ends (one line end, one load end) of the respective first leakage current detection lines.

The two test modules (107, 107) are either coupled to the third resistor (R6) (FIGS. 2, 4, 7, 8) or respectively coupled to the third and fourth resistors (R6, R61) (FIGS. 3, 5, 6).

In the above embodiments, each of the two leakage current detection lines is configured to cover one of the two power supply lines and form a leakage current detection loop with the drive module. Thus, the LCDI device can individually detect the leakage current on the two power supply lines and individually detect the open circuit conditions of the two leakage current detection lines. Further, the LCDI device according to embodiments of the present invention have simple circuit structures, and are low cost and reliable.

Figure 9A:
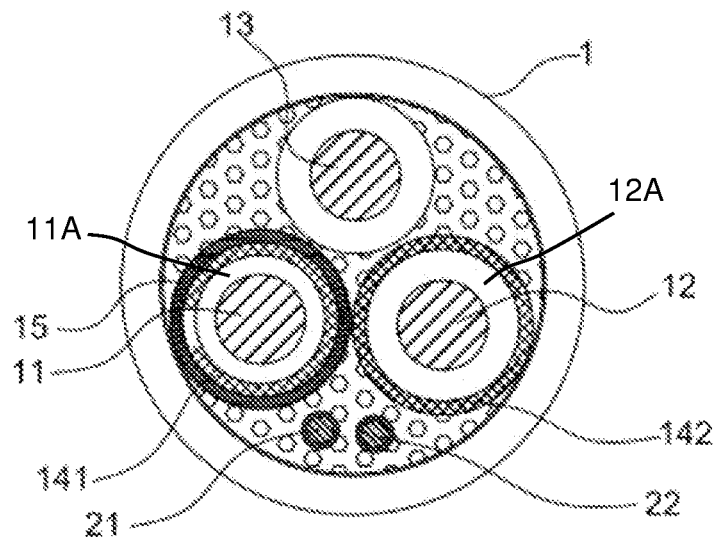
FIG. 9A is a cross-sectional view of a power cord according to an embodiment of the present invention.
Figure 9B:
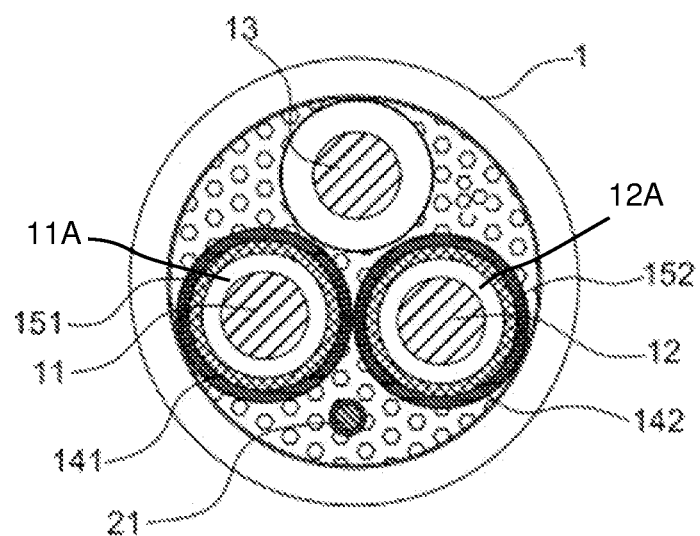
FIG. 9B is a cross-sectional view of a power cord according to another embodiment of the present invention.
Figure 9C:
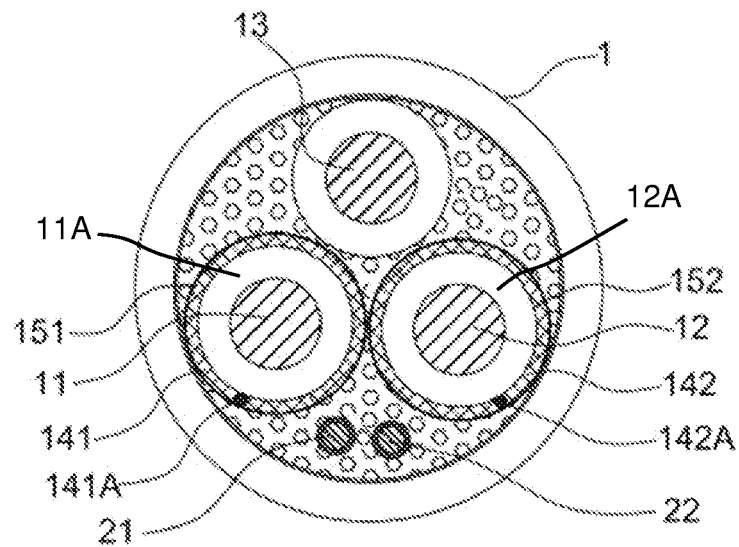
FIG. 9C is a cross-sectional view of a power cord according to yet another embodiment of the present invention.
Figure 9D:
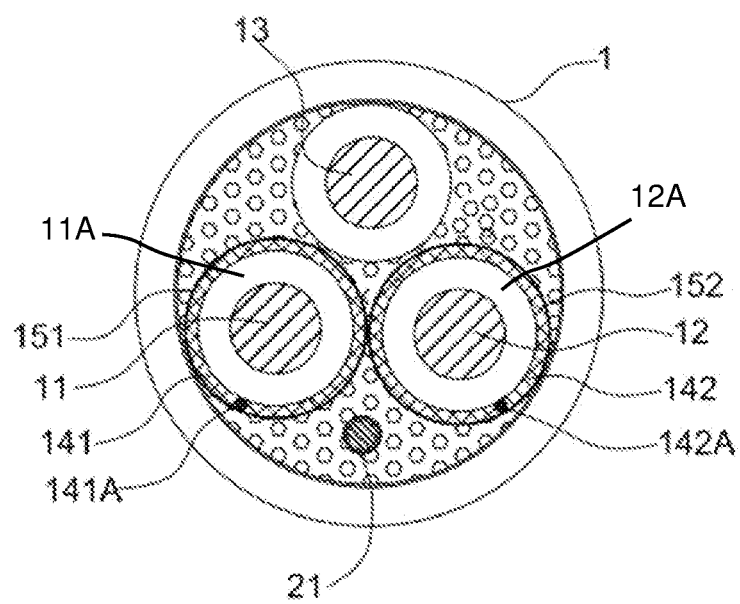
FIG. 9D is a cross-sectional view of a power cord according to a further embodiment of the present invention.

FIG. 9A is a cross-sectional view of a power cord according to an embodiment of the present invention. FIG. 9B is a cross-sectional view of a power cord according to another embodiment of the present invention. FIG. 9C is a cross-sectional view of a power cord according to yet another embodiment of the present invention. FIG. 9D is a cross-sectional view of a power cord according to a further embodiment of the present invention.

As shown in FIG. 9A, the power cord 1 includes the first power supply line 11 (e.g., hot line L), the second power supply line 12 (e.g. neutral line N), the third power supply line 13 (e.g. ground line G), the first leakage current detection line 141, the second leakage current detection line 142, and the first and second connector lines 21 and 22. The power cord 1 may be used in the LCDI devices of the embodiments of FIGS. 3-6. The first leakage current detection line 141 covers the first power supply line 11 with an insulating layer 11A in between, and the second leakage current detection line 142 covers the second power supply line 12 with an insulating layer 12A in between. As shown in FIG. 9A, the power cord 1 may further includes filling materials (filler). In the embodiment shown in FIG. 9A, the first leakage current detection line 141 is covered by an insulating layer 15, and the second leakage current detection line 142 is not covered by a separate insulating layer. In alternative embodiments, both the first leakage current detection line 141 and the second leakage current detection line 142 may be separately covered with insulating layers, or, the first leakage current detection line 141 is not covered by an insulating layer and second leakage current detection line 142 is covered by an insulating layer. The first leakage current detection line 141 and second leakage current detection line 142 may be formed of a metal (e.g. copper, aluminum, etc.) woven structure, or a wound structure formed of at least one metal wire, or a metal foil cover, or combinations of any one or more of the above. The insulating layers may be formed of a one-piece plastic material, or formed of insulating paper or fabric or other insulating materials.

The power cord 1 of FIG. 9B is different from that of FIG. 9A in that, in FIG. 9B, the power cord 1 includes only one connector line 21; moreover, the first leakage current detection line 141 is covered by a first insulating layer 151 and the second leakage current detection line 142 is covered by a second insulating layer 152. The power cord 1 of FIG. 9B may be used in the LCDI devices of the embodiments of FIGS. 2, 7 and 8. Similar to FIG. 9A, in FIG. 9B, the connector line 21 may be disposed in any suitable locations within the cord. In alternative embodiment, one of the first and second leakage current detection lines 141 and 142 is covered by an insulating layer and the other one is not.

The power cord 1 of FIG. 9C is different from that of FIG. 9A in that, in FIG. 9C, each of the first leakage current detection line 141 and second leakage current detection line 142 is formed of a single-sided insulating material (i.e., a sheet material having one side being a conductive material and the other side being an insulating material) that covers the respective power supply line (with the conductive side facing in and insulating side facing out), so no separate insulating layer outside of the leakage current detection line is required. The power cord 1 of FIG. 9C may be used in the LCDI devices of the embodiments of FIGS. 3-6. In this embodiment, a single-sided insulating material with an aluminum conductive side is used as the first leakage current detection line 141 and second leakage current detection line 142, and the insulating layers 151, 152 are the insulating sides of the respective single-sided insulating material. Two respective drain lines (conductors) 141A and 142A are enclosed inside of the conductive side of the respective single-sided insulating material. The embodiment of FIG. 9D is similar to that of FIG. 9C, but only one connector line 21 is provided. The power cord 1 of FIG. 9D may be used in the LCDI devices of the embodiments of FIGS. 2, 7 and 8.

Although in FIGS. 9A-9D the connector lines 21 and 22 (or only the connector line 21) are located below the first and second leakage current detection lines 141 and 142 in the illustrated orientation, it should be understood that the connector line(s) may be located at any suitable locations within the cord. Further, although in FIGS. 9A-9D the exterior shape of the cross-section of the cord 1 is round, the exterior shape may alternatively be an elongated shape with the power supply lines arrange side-by-side, or other suitable shapes and arrangements.

Some additional embodiments of the present invention provide an electrical power connection device, which includes a body and an LCDI device according to any one of the above embodiments disposed inside the body.

Other additional embodiments of the present invention provide an electrical appliance, which includes an electrical load, and an electrical power connection device coupled between a power supply and the load to supply power to the load, where the electrical power connection device employs an LCDI device according to any one of the above embodiments.

While the present invention is described above using specific examples, these examples are only illustrative and do not limit the scope of the invention. It will be apparent to those skilled in the art that various modifications, additions and deletions can be made to the leakage current detection and interruption device of the present invention without departing from the spirit or scope of the invention.

What is claimed is:

1. A power cord with leakage current detection and interruption function, comprising:
   at least two power supply lines;
   at least two insulating layers respectively covering the at lease two power supply lines;
   at least two leakage current detection lines respectively disposed around the at least two insulating layers, including a first leakage current detection line and a second leakage current detection line;
   at least one connector line, electrically coupled to the first leakage current detection line and/or the second leakage current detection line; and
   at least one insulating structure, covering at least one of the at least two leakage current detection lines, to electrically insulate the first and second leakage current detection lines from each other.

2. The power cord of claim 1, wherein the at least one insulating structure and the at least one of the at least two leakage current detection lines are formed by a single-sided insulating material, the material being a sheet structure having one conductive side and one insulating side.

3. The power cord of claim 1, wherein the at least two leakage current detection lines are formed of conductive woven structures.

4. The power cord of claim 1, wherein the at least two leakage current detection lines are formed of metal foil covers.

5. The power cord of claim 1, wherein the at least two leakage current detection lines are formed of wound structures formed of one or more metal wires.

6. The power cord of claim 1, wherein the at least one insulating structure is formed of a one-piece plastic material.

7. The power cord of claim 1, wherein the at least one insulating structure is formed of insulating paper or plastic sheet or fabric that surrounds the at least one of the at least two leakage current detection lines.

8. The power cord of claim 1, comprising at least two insulating structures, respectively covering the at least two leakage current detection lines.

9. The power cord of claim 1, further comprising a leakage current detection and interruption circuit which includes:
   a switch module, configured to control an electrical connection of the at least two power supply lines to a power input;
   a leakage current detection module, including the first leakage current detection line and the second leakage current detection line; and
   a drive module, coupled to the switch module and the leakage current detection module, and configured to control the switch module to disconnect the electrical connection in response to a leakage current signal from the leakage current detection module.

10. The power cord of claim 9, wherein the leakage current detection and interruption circuit further includes a test module, including a test switch coupled to the leakage current detection module, wherein at least the test module and the leakage current detection module form a test circuit, wherein in response to the test switch being manually operated, the drive module drives the switch module to disconnect the electrical connection.

* * * * *